US012046402B2

(12) United States Patent
Aguirre et al.

(10) Patent No.: US 12,046,402 B2
(45) Date of Patent: Jul. 23, 2024

(54) INTERNAL SUPPORTS FOR SHELL FORM TRANSFORMERS

(71) Applicant: Hitachi Energy Ltd, Zürich (CH)

(72) Inventors: Miguel Aguirre, Cordova (ES); Carlos Gonzalez-Garcia, Cordova (ES); Pablo Pacheco, Cordova (ES)

(73) Assignee: Hitachi Energy Ltd, Zürich (CH)

( * ) Notice: Subject to any disclaimer, the term of this patent is extended or adjusted under 35 U.S.C. 154(b) by 544 days.

(21) Appl. No.: 17/293,626

(22) PCT Filed: Nov. 13, 2019

(86) PCT No.: PCT/EP2019/081239

§ 371 (c)(1),
(2) Date: May 13, 2021

(87) PCT Pub. No.: WO2020/099517

PCT Pub. Date: May 22, 2020

(65) Prior Publication Data

US 2022/0013273 A1 Jan. 13, 2022

(30) Foreign Application Priority Data

Nov. 14, 2018 (EP) .................................... 18382802

(51) Int. Cl.
*H01F 27/02* (2006.01)
*H01F 41/02* (2006.01)

(52) U.S. Cl.
CPC ............. *H01F 27/02* (2013.01); *H01F 41/02* (2013.01)

(58) Field of Classification Search
CPC .......... H01F 27/02; H01F 41/02; H01F 27/10; H01F 27/205; H01F 27/027; H01F 27/04;
(Continued)

(56) References Cited

U.S. PATENT DOCUMENTS 2,491,171 A 6/1960 Wiederkehr
3,235,823 A * 2/1966 Renberg, Jr. ............ H01F 27/02 336/12
(Continued)

FOREIGN PATENT DOCUMENTS

CN 203706841 U 7/2014
CN 206672771 U 11/2017
(Continued)

OTHER PUBLICATIONS

Office Action, Chinese Patent Application No. 201980071811.1, mailed Aug. 12, 2023, 7 pages.
(Continued)

*Primary Examiner* — Mang Tin Bik Lian
(74) *Attorney, Agent, or Firm* — Sage Patent Group

(57) ABSTRACT

A transformer tank for a shell form transformer, for housing an active part of a three-phase transformer including transformer phases is provided. The tank includes a bottom tank part and a medium tank part comprising bottom plate and walls, a cover plate, reinforcing beams joined to the walls, interphase plates and stiffening supports for strengthening the cover plate. The interphase plates are to be arranged in a lower space of the tank, between adjacent transformer phases, extending from one wall to an opposite wall of the tank and coupled to the reinforcing beams. Each stiffening support is to be coupled to an interphase plate and extends in an upper space of the tank between the interphase plate and the cover plate, to cooperate with the cover plate. A three-phase shell form transformer and a method to assemble the transformer are also provided.

15 Claims, 6 Drawing Sheets

(58) Field of Classification Search
CPC ........ H01F 27/08; H01F 27/105; H01F 27/12; H01F 27/125; H01F 27/14; H01F 27/16; H01F 27/20; H01F 30/12
See application file for complete search history.

(56) References Cited

U.S. PATENT DOCUMENTS

| | | | | |
|---|---|---|---|---|
| 3,504,319 | A * | 3/1970 | Leonard | H01F 27/266 174/37 |
| 3,579,163 | A | 5/1971 | Cronin | |
| 4,834,257 | A * | 5/1989 | Book | H01F 27/02 165/104.33 |
| 4,875,277 | A * | 10/1989 | Martin | H01F 30/16 29/606 |
| 5,184,104 | A * | 2/1993 | Kondo | H01F 27/33 181/294 |
| 7,902,950 | B2 | 3/2011 | Yang et al. | |
| 9,105,393 | B2 * | 8/2015 | Takahashi | H01F 27/08 |
| 9,230,729 | B2 * | 1/2016 | Kubota | H01F 41/0226 |
| 2011/0273255 | A1 * | 11/2011 | Thompson | H01F 27/02 220/652 |
| 2013/0314199 | A1 * | 11/2013 | Yamashita | H01F 27/36 336/84 M |
| 2016/0086726 | A1 * | 3/2016 | Ono | H01F 27/36 336/84 M |
| 2016/0107795 | A1 * | 4/2016 | Brodeur | H01F 27/02 220/669 |

FOREIGN PATENT DOCUMENTS

| | | | |
|---|---|---|---|
| DE | 10117846 | C1 | 2/2003 |
| EP | 3133615 | A1 | 2/2017 |
| JP | S56141433 | U | 10/1981 |
| JP | S602813 | U | 1/1985 |
| JP | 0582022 | U | 5/1993 |
| JP | 2574221 | Y2 | 6/1998 |
| JP | H11243018 | A | 9/1999 |
| JP | 2008053262 | A | 3/2008 |
| JP | 2017501593 | A | 1/2017 |
| WO | WO 2015/025392 | A1 | 2/2015 |
| WO | WO 2015/101634 | A1 | 7/2015 |
| WO | WO 2014/174915 | | 2/2017 |

OTHER PUBLICATIONS

Notice of Grounds for Rejection, Korean Patent Application No. 10-2021-7011232, mailed Dec. 9, 2022, 10 pages.

International Search Report and Written Opinion of the International Searching Authority, PCT/EP2019/081239, mailed Feb. 5, 2020, 11 pages.

Abi-Samra, N., et al., "Power Transformer Tank Rupture And Mitigation—A Summary of Current State of Practice and Knowledge by the Task Force of IEEE Power Transformer Subcommittee," IEEE Transactions on Power Delivery, vol. 24, No. 4, Oct. 2009, pp. 1959-1967.

Office Action for Japanese Patent Application No. 2021-526361, mailed Aug. 19, 2022, 13 pages.

* cited by examiner

FIG. 2
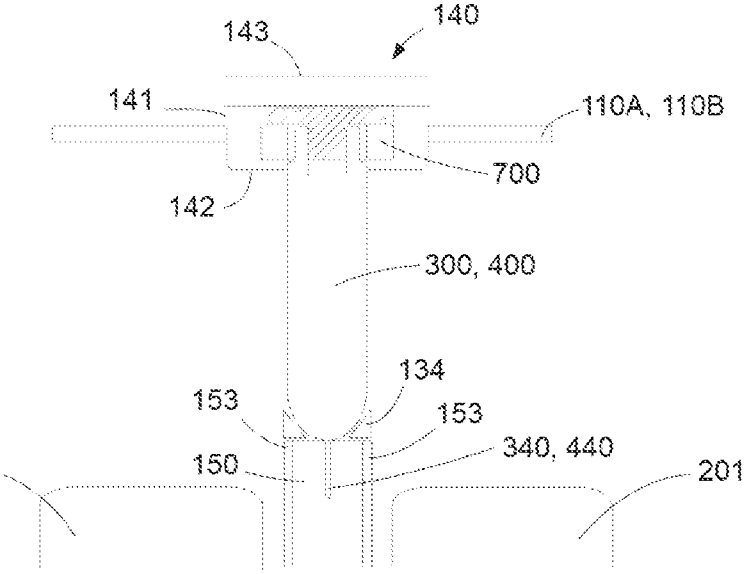
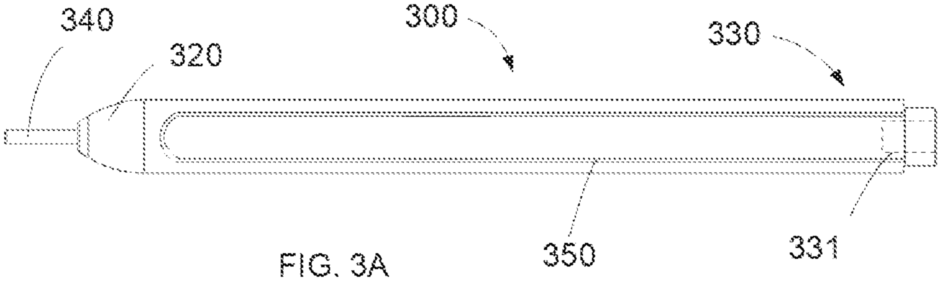
FIG. 3A
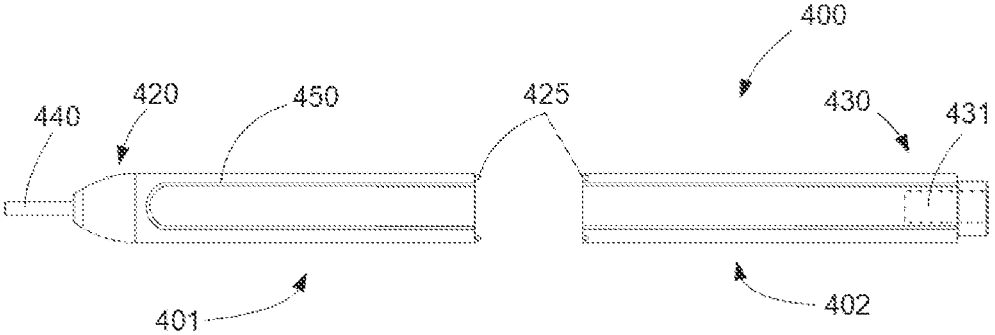
FIG. 3B

INTERNAL SUPPORTS FOR SHELL FORM TRANSFORMERS

The present disclosure is related to a tank for shell transformers, more specifically to tanks for three-phase shell form transformers.

The present application claims the benefit and priority of EP 18 382 802.9, filed on Nov. 14, 2018.

BACKGROUND ART

Transformer tanks are usually subjected to vacuum, e.g. around 0.09 mmHg, which may lead to an inward deformation of certain regions or parts of the tank, such as the cover, that would break when the mechanical stresses exceed the ultimate tensile strength.

Besides, power transformers may be subjected to internal arc energy in case of internal failure. The insulating fluid surrounding the active part of the transformer may then vaporize and create an expanding gas bubble, causing an overpressure that may break the transformer tank outwardly.

In case of an internal arc, the resulting overpressure will create mechanical stresses in the tank that may exceed the ultimate tensile strength of at least certain regions or parts of the tank e.g. the cover, which may thus suffer a non-admissible strain and deform and/or break, at a low level of energy for internal arcs.

In any event, the rupture of the tank may cause oil spills and the risk of fire breaking out.

Transformer tanks are therefore be designed to withstand the loads caused by the operating vacuum and also the mechanical stresses caused by an internal arc fault.

Some solutions have been developed to address the problem of deformation and/or rupture of the cover plate of the tank, caused by internal operating vacuum and/or in case of internal arc fault, by strengthening the cover plate by adding, e.g. by welding, external reinforcing beams or ribs. However, external ribs or beams may hinder the movements of the maintenance staff, and may even be dangerous for walking on the transformer cover. Furthermore, reinforcing the cover of the tank results in a heavy structure having a less flexible mechanical configuration and also involves high manufacturing costs. This solution, mainly cooled by air could also create overheating issues at the vicinity of high current leads if not properly designed.

In conclusion, it would be desirable to provide a transformer tank having a light structure and low manufacturing costs while at the same time being safe and rupture resistant.

SUMMARY

A transformer tank for a shell form transformer, for housing an active part of a three-phase transformer comprising transformer phases, is provided. The tank comprises a bottom tank part and a medium tank part comprising bottom plate and walls, a cover plate, reinforcing beams joined to the walls, interphase plates and stiffening supports for strengthening the cover plate. The interphase plates are to be arranged in a lower space of the tank, between adjacent transformer phases, extending from one wall to an opposite wall of the tank and coupled to the reinforcing beams. Each stiffening support is to be coupled to an interphase plate and extend in an upper space of the tank between the interphase plate and the cover plate, to cooperate with the cover plate.

By using such stiffening supports arranged inside the tank, the loads and/or stresses caused by the operating vacuum are shifted from the cover plate, and as a result, the stiffening supports may assist in withstanding the stresses and avoiding the deformation and/or rupture of the cover plate.

The stiffening supports provide more strength against inward deflection of the cover plate, which may render external supports unnecessary. As fewer obstacles are arranged on the cover plate, the safety when an operator is e.g. inspecting the tank, is thus increased. Furthermore, the resulting structure is lighter and involves less manufacturing costs as the cover plate does not require external supports and may be more flexible.

The stiffening supports may contact the cover plate when the latter deforms, e.g. when it deforms inwardly. This contact may be direct or through an intermediate part.

The stiffening supports may also be coupled to the cover plate, directly or through intermediate parts, so as to prevent at least the inward deformation.

In case a significant outward deformation of the cover, e.g. in case of an overpressure, is also to be prevented, embodiments of the stiffening supports may also be designed to withstand such an internal positive pressure.

In case a significant degree of outward deformation of the cover needs to be allowed, e.g. in case of an internal arc overpressure, embodiments of the stiffening supports may also be designed to allow such a deformation.

The walls of the tank may comprise two opposing short walls or side walls, and two opposing longer walls or front walls thereby forming a four wall structure of rectangular cross-section. In such cases, the reinforcing beams may also comprise side beams arranged on the side walls of the tank, i.e. on the shorter walls of the tank walls, and main beams attached to the front walls i.e. the longer walls of the tank walls. Besides, the interphase plates to be arranged in a lower space of the tank, between adjacent transformer phases, may extend from one front wall to an opposite front wall of the tank and be coupled to the main beams.

In an example, the stiffening supports are hollow supports which may comprise a conduit for recirculating coolant thereby reducing the heat caused by the magnetic flux.

In an example, each stiffening support comprises a first part to be coupled to an interphase plate and a second part to be arranged so as to cooperate with the cover plate. Using a stiffening support having two parts facilitates the transport and assembly of the tank e.g. when the dimensions of the tank do not enable the transport of the assembled tank.

In an example, the cover plate comprises a linking housing in which a linking piece that cooperates with the stiffening support may be arranged. The linking piece may be a T-shaped piece or an elongated rod, thereby enabling the support to work under vacuum and overpressure, or solely under vacuum which additionally permits the cover to partly deflect, respectively.

In an example, the cover plate has no external reinforcing ribs, and therefore an operator walking on the cover plate e.g. to repair or gain access to the input/output connections, could work more comfortably and safely.

According to a second aspect, a three-phase shell form transformer comprising a transformer tank according to any of the disclosed examples is provided.

According to a third aspect, a method for assembling a transformer tank is provided. Firstly each stiffening support is fixed to an interphase plate. Then, the tank is closed with the cover plate such that the distal end of each stiffening support is introduced through an opening of the bottom wall of a linking housing. A linking piece is then inserted at the distal end of each stiffening support, and the removable cover of each linking housing is closed.

BRIEF DESCRIPTION OF THE DRAWINGS

Particular embodiments of the present device will be described in the following by way of non-limiting examples, with reference to the appended drawings, in which:

FIG. 2 illustrates a schematic partial cross-section of the tank of FIGS. 1A and 1B;

FIGS. 3A and 3B illustrate schematic side views of stiffening supports according to examples;

DETAILED DESCRIPTION

Figure 1A:
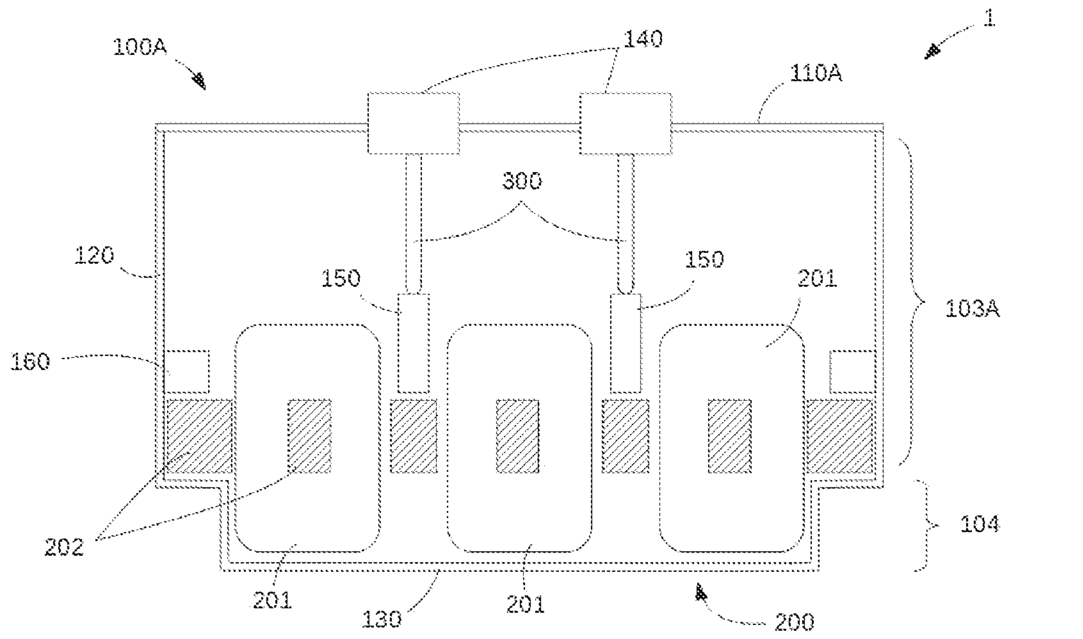
FIGS. 1A and 1B illustrate schematic and simplified cross-sections of a system comprising a three-phase shell form transformer and a tank according to examples.
Figure 1B:
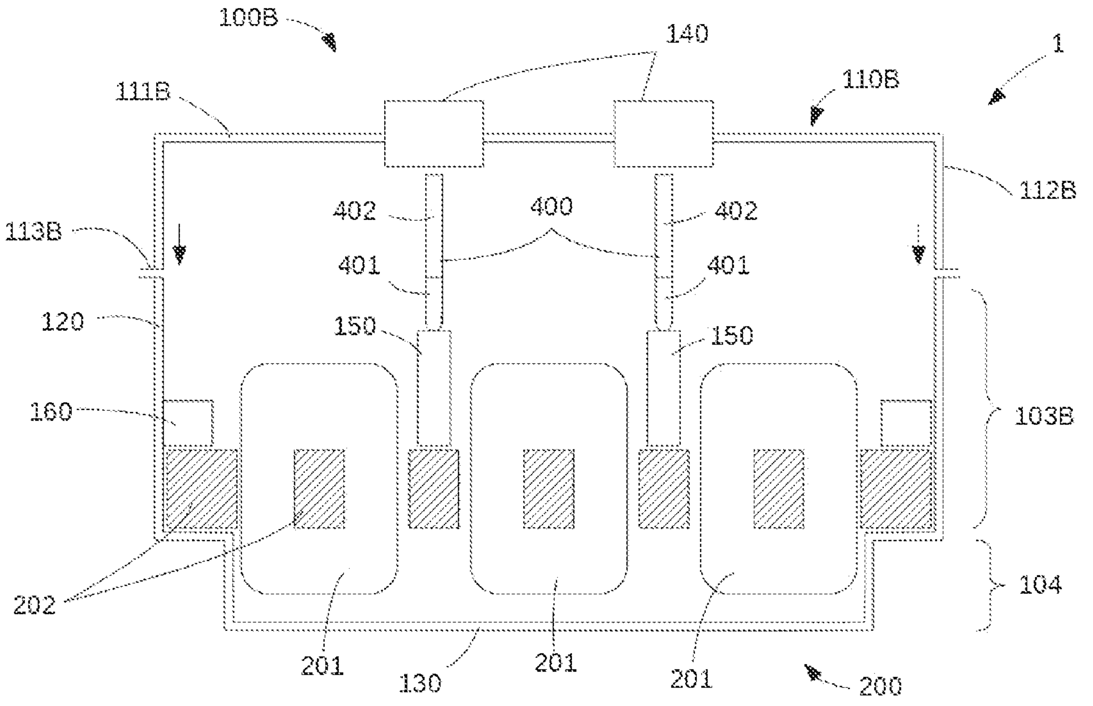

FIGS. 1A and 1B show examples of a transformer 1 which may comprise a shell form transformer 200, e.g. a three-phase shell form transformer core having three phases 201 and a magnetic circuit 202, and a transformer tank 100A, 100B (herein "tank") that once closed may be subject to vacuum, e.g. of about 0.09 mmHg, in order to ensure negative pressure therein.

The tank 100A, 100B may comprise a bottom tank part 104 and a medium tank part 103A, 103B. The bottom tank part 104 and medium tank part 103A, 103B may comprise a bottom plate 130 and walls 120 thereby defining a hollow space or cavity. The tank 100A, 1008 may thus comprise a bottom plate 130 and four walls 120 which may be joined together, e.g. by welding or by any other suitable method.

In an example, the tank walls may comprise different lengths, that is, the tank may comprise two short walls or side walls, and two longer walls or front walls, thereby forming a rectangular cross-section tank.

Additionally, the tank 100A, 1008 may comprise reinforcing beams 160 which may be joined e.g. by welding, to the walls 120 of the tank for example at the medium tank part. The reinforcing beams 160 may be placed all around the hollow space thereby creating a ring-shape structure and may provide stiffness to the tank and also aid withstanding short-circuits loads.

In an example, the reinforcing beams 160 may comprise side beams which may be attached to the side walls of the tank, i.e. to the short walls, and main beams that may be attached to the front walls of the tank i.e. to the longer walls. The side beams may thus be shorter that main beams.

The tank 100A, 1008 may further comprise a cover plate 110A, 100B to be arranged on top of the walls 120 thereby closing the tank. The cover plate 110A, 1108 may be an independent part which may be separately manufactured and handled, and which may be joined, e.g. welded, to the structure formed by the walls 120 and the bottom plate 130 at a later stage. As a consequence, the tank 100A, 1008 may be transported partly disassembled to a predetermined location. The active part of the transformer i.e. the phases and the magnetic circuit, may be loaded and fitted into the bottom tank part. The medium tank part may afterwards be mounted over the active part and then the medium and bottom tank parts may be joined together e.g. by welding. The reinforcing beams may also be joined after loading the active part of the transformer. These operations may be done in factory. On site, the cover plate may be joined to the walls e.g. by welding, by screwing or by any other suitable method. Then, the input/output connections may be prepared, the tank may be filled with coolant and vacuum may be applied.

The cover plate 110A, 110B may comprise a plurality of openings and/or plugs (not shown) e.g. for inputting/outputting the generated electrical current, input/outputs for injecting/extracting the coolant, etc. Additionally, the cover plate 110A, 110B may comprise linking housings 140 which may comprise side walls 141, a bottom wall 142 comprising an opening and a detachable closure 143, thereby defining a cavity (see FIG. 2). The closure 143 may be removable and may be attached/detached from the linking housing, e.g. with screws, for gaining access to the cavity of the tank.

The cover plate 110A, 100B may be made of a material, e.g. carbon steel or other non-metallic material, capable of safely closing the tank and withstanding the work pressures in the tank but flexible enough to bend under a certain stress. Besides, the cover plate 110A, 110B may have a predefined thickness e.g. about 2-3.5 cm, which may avoid the cover plate to bend under its own weight and which may be thick enough to enable the cover plate to withstand the normal operating overpressures and vacuum without breaking.

In an example, the walls 120, the bottom wall 130, the reinforcing beams and the cover plate 110 of the tank may be made of the same material e.g. carbon steel.

In some examples, such as the one of FIG. 1A, the cover plate 110A may be a flat plate. In alternative examples, such as the one of FIG. 1B, the cover plate 110B may be a U-shaped cover which may comprise a flat portion 111B, flanges 112B and outwardly extending portion 113B which may facilitate joining the cover plate 110B to the walls 120.

Figure 6:
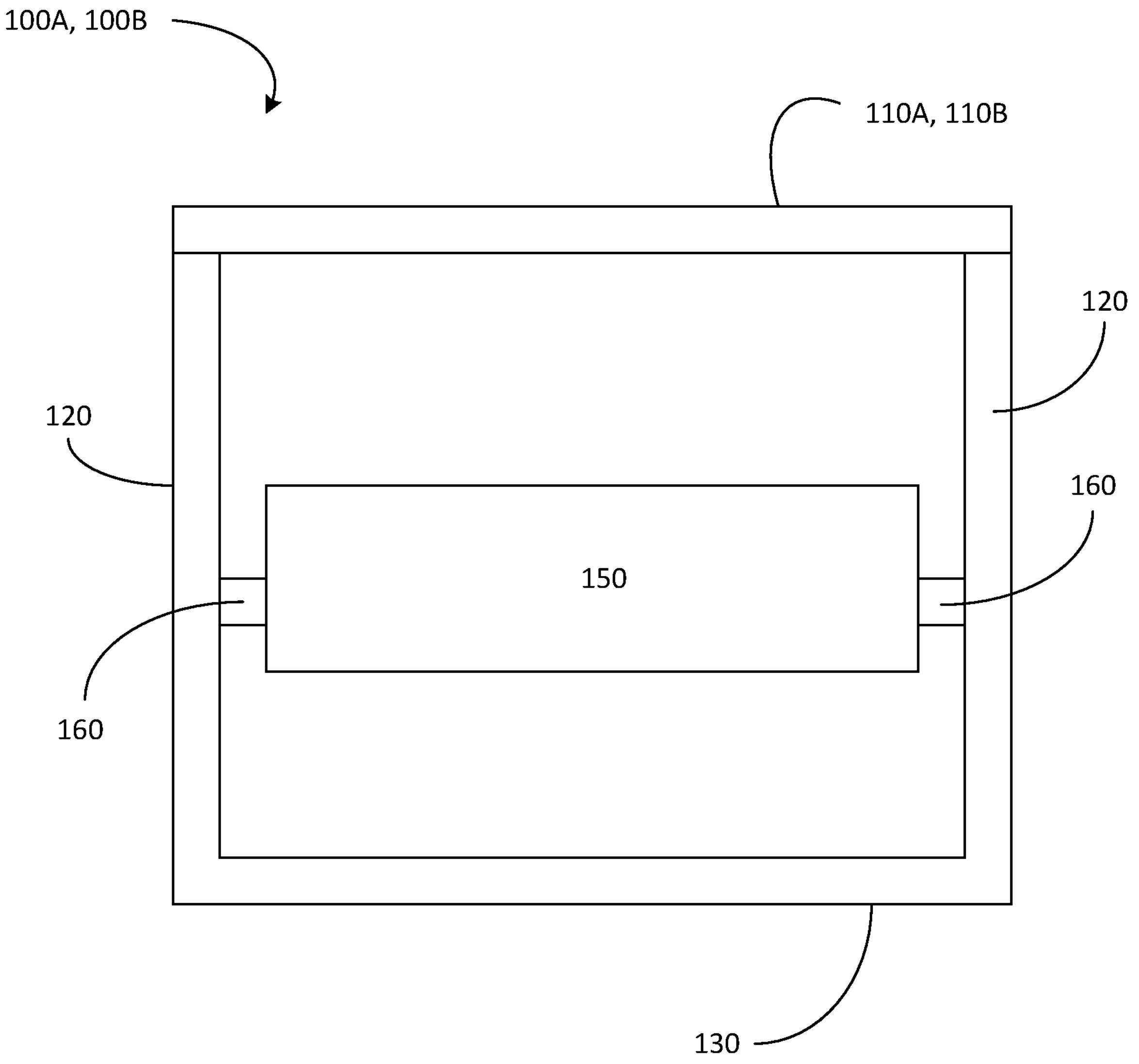
FIG. 6 illustrates a schematic diagram of interphase plates to be arranged adjacent to a lower space of the tank extending from one wall to an opposite wall of the tank and coupled to reinforcing beams according to an example.

The tank 100A, 100B may further comprise interphase plates 150 that may be arranged in a lower space extending from one wall to an opposite wall 120 of the tank 100A, 100B, as shown in FIG. 6. In examples wherein the tank walls comprise side walls and front walls, the interphase plates 150 may extend from one front wall of the tank to an opposite front wall.

The interphase plates 150 may be joined to the reinforcing beams 160, as shown in FIG. 6, e.g. by welding. In examples wherein reinforcing beams comprise main beams and side beams, the interphase plates 150 may be joined to main beams.

When in use, i.e. once transformer phases are loaded, each interphase plate 150 would be arranged between two adjacent transformer phases 201, as shown in FIGS. 1A and 1B, to which each interphase plate may subsequently be attached e.g. welded to the main beams. In an example, the interphase plates 150 may be flat and/or substantially rectangular sheets which may be made of metal, e.g., a carbon steel. The interphase plates 150 provide stiffness to the tank and also help to withstand short-circuit loads.

In an example, the interphase plates 150 may comprise a magnetic shielding 153 (see FIG. 2) on each surface facing a transformer phases for collecting and re-directing the magnetic flux of the phases.

Figure 7:
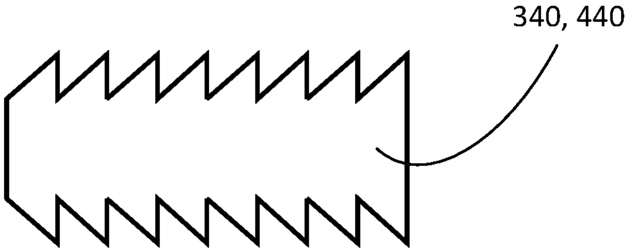
FIG. 7 illustrates a schematic diagram of a coupling element being a threaded stud according to an example.

The tank 100A, 100B of any of the examples of FIG. 1A or 1B, may further comprise elongate stiffening supports 300, 400 to strengthen the structure of the tank. The stiffening supports 300, 400 may comprise a proximal end 320, 420 and a distal end 330, 430 (see FIGS. 3A and 3B). The proximal end 320, 420 may comprise a coupling element 340, 440, e.g. a threaded stud, as shown in FIG. 7, for coupling the stiffening support 300, 400 to the interphase plate 150 which may comprise complementary couplings such as a threaded hole. The cooperation between the stiffening supports and the interphase plates enable withstanding part of the mechanical stresses displaced from the cover plate. The loads on the cover plate and its deflection may thus be reduced and so, there may be no need to add reinforcing beams or ribs on the (external) surface of the cover.

In an example, the proximal end 320, 420 may be rounded to minimize the dielectric stress at the coupling between the stiffening support 300, 400 and the interphase plate 150.

The stiffening supports 300, 400 may be arranged in an upper space of the tank between an interphase plate and the cover plate, and aligned with a linking housing 140 of the cover plate, whereby the stiffening support may be arranged to cooperate with the cover plate. The stiffening supports 300, 400 may be inserted into the cavity of the linking housing through the opening at the bottom wall 142 (see FIGS. 4A and 4B). In addition, in order to ensure a proper adjustment of the stiffening support in the linking housing, an adjusting element 700, e.g. a pair of eccentrics 701, 702 made of fiberglass or any other suitable material, may be introduced in the linking housing around the stiffening support (see FIGS. 4A and 4B). The adjusting element 700 may therefore be arranged between the stiffening support and the linking housing.

FIG. 2 depicts a simplified detailed view a stiffening support 300, 400 coupled to an interphase plate 150 and arranged so as to cooperate with the cover plate 110A 110B via a linking housing 140. The interphase plate 150 may be arranged between two transformer phases 201 and may comprise a magnetic shielding 153 on the surfaces facing a transformer phase 201. The stiffening support 300, 400 may comprise a coupling element 340, 440 e.g. a threaded stud, to be coupled to the interphase plate. In order to protect the coupling between the stiffening support and the interphase plate a dielectric element 134 may be added around the coupling.

The linking housing 140 of the cover plate 110A, 110B may comprise a removable closure 143, side walls 141 and a bottom wall 142 thereby forming a cavity. The linking housing may comprise an adjusting element 700 to correct deviations of the stiffening support.

The stiffening supports 300, 400 may comprise a recess 331, 431 in the distal end (see FIGS. 3A and 3B) and may comprise a conduit 350, 450 for circulating a coolant. Additionally, in an example, the stiffening supports 300, 400 may be coated with a magnetically isolating layer (not shown).

FIG. 3A depicts a stiffening support 300 which may be a single continuous piece comprising a proximal end 320 and a distal end 330 which may comprise a recess 331. The proximal end 320 may be rounded in order to minimize the dielectric stress and may comprise a coupling element 340, e.g. a threaded stud, for fixing the stiffening support to an interphase plate. The stiffening support 300 may also comprise a conduit 350 for circulating a coolant e.g. oil.

In general, the tank 100A, 100B is transported from a factory to an operating location e.g. by truck. However, and subjected to e.g. local traffic restrictions and/or the capacity of the truck, there may be cases in which the dimensions of the tank are not suitable to transport the entire (assembled) tank e.g. because it exceeds the maximum allowed size.

For such cases, in order to comply with transport requirements, the cover plate may be a U-shaped plate 110B, such as in FIG. 1B, so the presence of the flanges 112B allows reducing the height of the medium and bottom tank parts with respect to the height that the same parts would have if the cover was flat.

Before being loaded in a truck, the phases 201 and the magnetic circuit of the transformer may be stacked into bottom tank part 104. Then, the medium tank part 103B with the reinforcing beams and the interphase plates may be mounted and joined to the bottom part. The assembly may then be filled with coolant and subject to vacuum after being closed with a transport cover plate (not shown), and transported to the operating location. Once the tank is on site, the transport cover plate may be removed and the U-shaped cover plate 110B may be attached, e.g. by welding, thereby assembling the whole tank 100B.

During transport, the vacuum and/or the standard overpressure caused by the coolant may cause stresses on the cover plate which may therefore need to be strengthened in order to avoid deformations. Similarly, once the transport cover plate is removed and the cover plate arranged, the stresses caused at least by the operating pressures, i.e. vacuum and coolant overpressure, may also need to be withstood. An embodiment of the stiffening support according to the present disclosure may be used for these purposes.

In an example, the stiffening support may be divided a first part and a second part. The first part may have a length suitable for being arranged between an interphase plate and the transport cover plate during transport, and a second part to be coupled to the first part, that once assembled together may form a stiffening support to be arranged between an interphase plate and the cover plate.

The example of FIG. 3B depicts a stiffening support 400 which may be divided in a first part 401 to be coupled to the interphase plate, and a second part 402 to be arranged so as to cooperate with the cover plate 110 e.g. via a linking piece (see below in relation to FIGS. 4A and 4B). Both the first part 401 and second part 402 may comprise complementary couplings 425 at their facing ends for securely connecting, e.g. screwing, both parts together.

In addition, the first part 401 of the stiffening support 400 may comprise a coupling element 440, e.g. a threaded stud, for fixing the first part to an interphase plate 150 e.g. via a threaded hole. Similarly to the example of FIG. 3A, the second part 402 may comprise a recess, wherein a linking piece 500, 600 (see below in relation to FIGS. 4A and 4B) may be coupled.

The length of the first part 401 of the stiffening support 400 may therefore correspond to the distance from the interphase plate to the transport cover plate. The second part 402 may have length that enables, once both parts 401, 402 are connected together, to obtain a stiffening support 400 having a length that corresponds to the distance from interphase plates 150 to the flat portion 111B of the cover plate 110B.

By using a stiffening support comprising a first part and a second part, the manufacturing costs and also the assembling time are reduced, as there may not need to manufacture and/or replace two stiffening supports of different lengths.

The number of stiffening supports 300, 400 that may be arranged in a tank may vary e.g. depending on the dimensions of the cover plate, i.e. a greater surface may require a higher number of stiffening supports.

In an example, each interphase plate 150 may comprise a stiffening support 300, 400 arranged therein. In such example, the stiffening supports may be substantially centred between the tank walls e.g. centred between side walls in examples comprising side and front walls.

In some examples, each interphase plate 150 of a tank may comprise two or more stiffening supports.

The tank 100 may further comprise independent and separate linking pieces 500, 600. Each linking piece may be coupled in a recess 331, 431 of the distal end 330, 430 of a stiffening support 300, 400 thereby completing an inner stiffening structure. Such an inner stiffening structure may comprise an interphase plate, a stiffening support and a linking piece, and may provide more strength against deflection of the cover plate e.g. in case of overpressure or operating vacuum. Depending on the form of the linking pieces 500, 600 the conditions under which the linking pieces reinforce the cover plate may differ.

In an example (see FIG. 4A), the linking piece 500 may be a T-shaped linking piece. The T-shaped linking piece may comprise laterally protruding head 502 and an elongated portion 501. Such linking piece may be efficient, i.e. may prevent the deformation of the cover plate, under operating vacuum, i.e. an inwardly pulling force, and also in overpressure cases, i.e. an outwardly pushing force.

In another example (FIG. 4B), the linking piece 600 may be an elongated rod that may be effective especially under operating vacuum but may allow the deformation of the cover plate in case of overpressure.

Figure 4A:
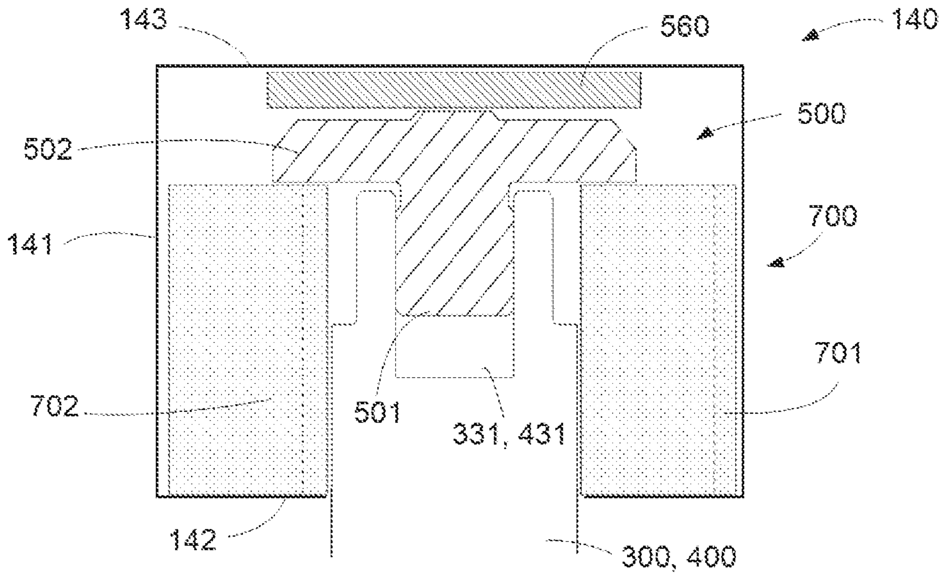
FIGS. 4A and 4B illustrate very schematic cross-sections of linking housings according to examples.

FIG. 4A shows a very schematic cross section of the cavity of a linking housing 140 having a bottom wall 142 with an opening, side walls 141 and removable closure 143 which may be fixed to the side walls 141 e.g. by screws (not shown). In the cavity of the linking housing 140 a distal end of a stiffening support 300, 400, a T-shaped linking piece 500 inserted in the recess 331, 431 of the stiffening support and an adjusting element 700, e.g. a pair of eccentrics 701, 702; coupled around the distal end of the stiffening support may be arranged.

In the example, the elongated portion 501 of the T-shaped piece 500 may be coupled to the recess 331, 431 of the stiffening support 300, 400, e.g. by screwing, and the head 502 of the T-shaped piece may rest on the adjusting element 700. The T-shaped piece may therefore be fixedly coupled to the stiffening support.

In addition, a layer or a plurality of layers e.g. made of corrugated cardboard or pressboard 560 may be added between the removable closure 143 of the linking housing 140 and the head 502 of T-shaped piece 500 to snuggly fit the T-shaped linking piece inside the linking housing. By snuggly fitting the T-shaped linking piece, a direct contact between the head 502 and the removable closure 143 may be enabled which may reduce the impact when both surfaces come into contact.

Under operating vacuum, the cover plate 110 tends to bend inwardly. An inwardly deformation may cause the removable closure 143 of the linking housing to press against the corrugated cardboard 560 and thus, the head 501 of the linking piece. As the head of the linking piece 500 may be in direct contact with the adjusting element 700 and fixed to the stiffening support, the stress may be shifted from the cover plate to the stiffening support. Further deformation of the cover plate 110 may therefore be prevented.

In case of normal overpressures, the cover plate 110 tends to deform outwardly. The adjusting element 700 would then be pushed upwardly by the bottom wall 142 which may cause the adjusting element 700 to push the head of the linking piece 500. As the linking piece 500 may be fixed to the stiffening support, the loads of the cover plate 110 may therefore be shifted to the stiffening support 300, 400 which may withstand the stress and may thus avoid a further deformation of the cover plate 110.

Figure 4B:
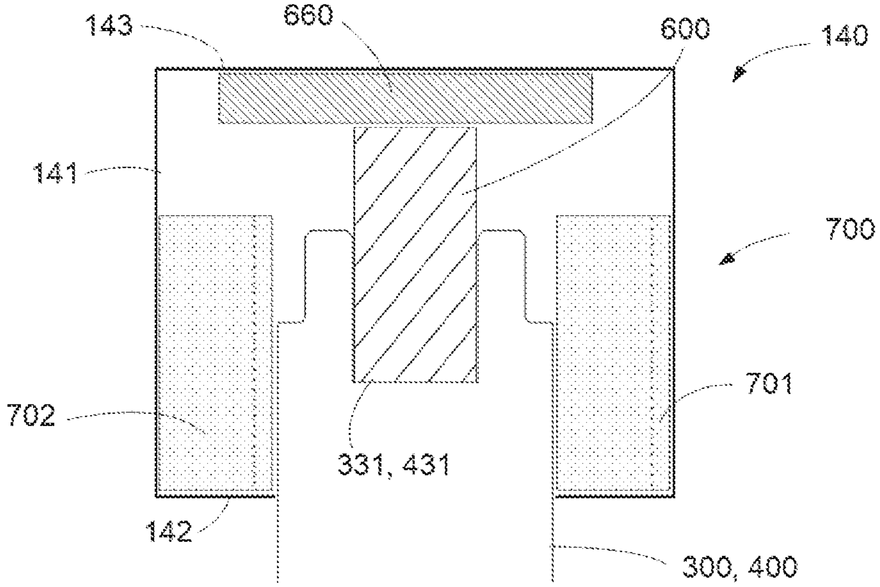

In the example of FIG. 4B, a very schematic cross section of the cavity of a linking housing 140 is depicted in which, in contrast to the example of FIG. 4A, the linking piece 600 is an elongated rod. In the example, a distal end of a stiffening support 300, 400, an elongated rod 600 inserted and screwed in the recess 331, 431 of the stiffening support and an adjusting element 700, e.g. a pair of eccentrics 701, 702; coupled around the distal end of the stiffening support may be arranged in the cavity of the linking housing 140.

In the example, a layer or a plurality of layers e.g. made of corrugated cardboard or pressboard 660 may be added between the removable closure 143 of the linking housing 140 and elongated piece 600 the impact when both surfaces come into contact may thus be reduced.

Under operating vacuum, the cover plate 110 tends to inwardly deform. The removable closure 143 of the linking housing would therefore come into contact with the linking piece 600 which would be pushed against the stiffening support. In examples comprising a plurality of layers of corrugated cardboard or pressboard, the cover plate 143 would firstly contact the plurality of layers. As a result, the stress of the cover plate may be shifted to the stiffening support which would withstand the loads and so, a further inward deformation of the cover plate 110 may consequently be avoided.

In the event of overpressure, and contrary to the example of FIG. 4A, no restriction to the movement of the cover plate 110 may be exerted by the linking piece 600, and so the cover plate 110 of the tank may bend outwardly. The tank and the cover may thus, in case of an internal arc, absorb part of the energy of the expanded gas and prevent the rupture of the tank.

In an example, the tank 100 may further comprise a reinforcing structure (not shown) e.g. a reinforcing cincture, a plurality of reinforcing beams, discrete C-shaped clamps, etc., on the external surface e.g. of the walls, to further reinforce the tank.

Figure 5:
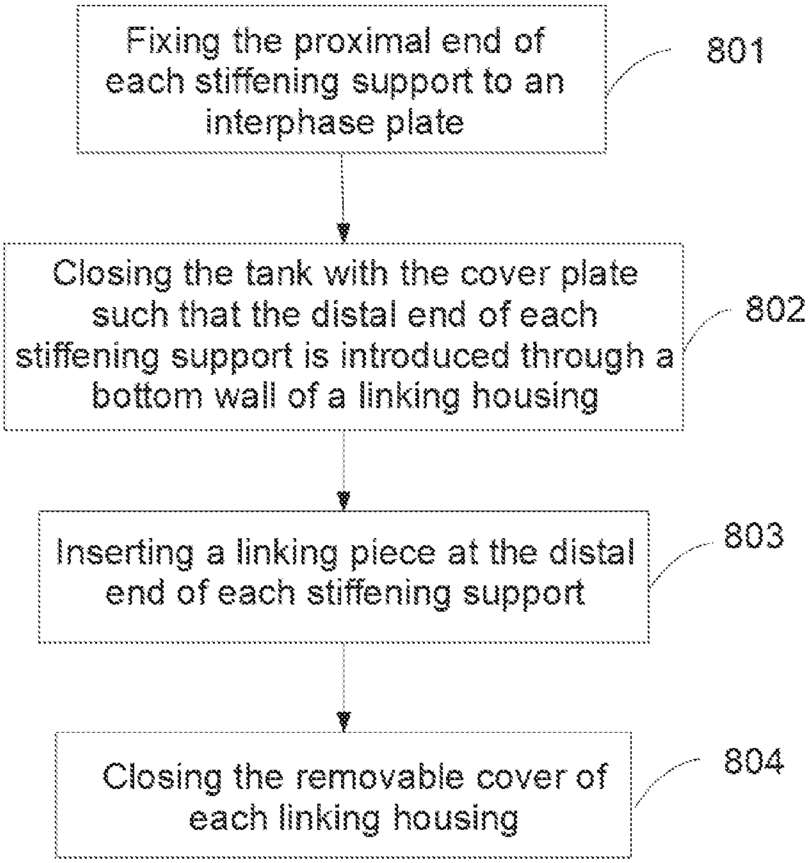
FIG. 5 illustrates a flow chart of a method to assemble a transformer according to an example.

FIG. 5 is a flow chart of a method for assembling a transformer. In an example, such assembling may occur after transporting, e.g. by truck, to a permanent location the assembled bottom and medium tank parts comprising the interphase plates arranged therein, and also once the active part of the transformer is stacked therein.

Firstly, the proximal end of each stiffening support may be fixed, in block 801, to an interphase plate e.g. by a coupling element. In examples where the stiffening support is divided in a first and a second part, the method may further comprise joining the second part to the first part thereby assembling a stiffening support, after fixing the first part to the interphase plate.

The tank may afterwards be closed by arranging and fixing, e.g. by welding, the cover plate on the walls. The tank may be closed, in block 802, with the cover plate such that the distal end of each stiffening support may be introduced through an opening of the bottom wall of a linking housing. The stiffening support would thereby be arranged inside the cavity of the linking housing so as to cooperate with the cover plate.

In an example, an adjusting piece, e.g. a pair of assembled eccentrics, may be coupled around the stiffening support. The adjusting piece, e.g. the eccentrics, may be manipulated so as to correctly adjust the position of the stiffening supports with respect to the linking housings i.e. to correct any deviation. A linking piece may then be inserted, in block 803, in distal end of each stiffening support e.g. in a recess.

In some examples, the linking piece may also be fixed to the support e.g. by screwing it. The removable closure of each linking housing may, in block 804, be closed e.g. by screwing it to the side walls of the linking housing.

Although only a number of particular embodiments and examples have been disclosed herein, it will be understood by those skilled in the art that other alternative embodiments and/or uses of the disclosed innovation and obvious modifications and equivalents thereof are possible. Furthermore, the present disclosure covers all possible combinations of the particular embodiments described. The scope of the present disclosure should not be limited by particular embodiments, but should be determined only by a fair reading of the claims that follow.

The invention claimed is:

1. A transformer tank for a shell form transformer, for housing an active part of a three-phase transformer comprising a plurality of transformer phases, the transformer tank comprising:

a bottom tank part;

a medium tank part, located over the bottom tank part;

a bottom tank plate located at the bottom tank part;

a plurality of tank walls located at the bottom tank part and the medium tank part, wherein the bottom tank plate and the plurality of tank walls are joined together;

a cover plate arranged on the plurality of tank walls opposite the bottom tank plate;

a plurality of reinforcing beams joined to the plurality of tank walls;

a plurality of interphase plates to be arranged adjacent to a lower space of the transformer tank, each between two adjacent transformer phases among the plurality of transformer phases, extending from one tank wall to an opposite tank wall among the plurality of tank walls and coupled to two opposite reinforcing beams among the plurality of reinforcing beams; and a plurality of stiffening supports for providing strength against the cover plate, wherein each stiffening support is to be coupled to a corresponding interphase plate and extend in an upper space of the transformer tank between the corresponding interphase plate and the cover plate, towards the cover plate.

2. The transformer tank according to claim 1, wherein each stiffening support comprises an elongated shape having a proximal end to be coupled to a corresponding interphase plate, and a distal end to be arranged towards the cover plate.

3. The transformer tank according to claim 1, wherein each stiffening support is a hollow support.

4. The transformer tank according to claim 1, wherein each stiffening support comprises a conduit for circulating a coolant.

5. The transformer tank according to claim 1, wherein each stiffening support comprises a first part to be coupled to a corresponding interphase plate and a second part to be arranged towards the cover plate.

6. The transformer tank according to claim 1, wherein each stiffening support comprises a first part to be coupled to a corresponding interphase plate, a second part to be arranged towards the cover plate, and complementary couplings to couple the first part and the second part together.

7. The transformer tank according to claim 1, wherein each stiffening support comprises a threaded stud in a proximal end thereof to be coupled to a corresponding interphase plate.

8. The transformer tank according to claim 1, wherein a proximal end of each stiffening support is rounded for minimizing dielectric stress.

9. The transformer tank according to claim 1, further comprising:

a plurality of linking pieces for coupling with the plurality of stiffening support and; and a plurality of linking housings arranged on the cover plate for coupling with the plurality of linking pieces.

10. The transformer tank according to claim 9, wherein each linking piece is a T-shaped piece or an elongated rod.

11. The transformer tank according to claim 1, wherein the plurality of reinforcing beams are placed in a hollow space of the transformer tank.

12. The transformer tank according to claim 1, wherein the plurality of stiffening supports comprise at least two stiffening supports, and wherein the plurality of interphase plates comprise at least two interphase plates.

13. The transformer tank according to claim 1, further comprising a plurality of adjusting elements each to be arranged between a corresponding linking housing among a plurality of linking housings arranged on the cover plate and a corresponding stiffening support.

14. A three-phase shell form transformer comprising the transformer tank according to claim 1.

15. A method for assembling the shell form transformer according claim 1, comprising:

fixing a proximal end of each stiffening support to a corresponding interphase plate;

closing the transformer tank with the cover plate such that a distal end of each stiffening support is introduced through an opening of a bottom housing wall of a corresponding linking housing among a plurality of linking housings arranged on the cover plate;

inserting a linking piece at the distal end of each stiffening support; and closing a removable closure of each linking housing.

* * * * *